E. W. PAULSON.
VALVE MECHANISM FOR CORN PLANTERS.
APPLICATION FILED JAN. 20, 1919.
1,357,298.
Patented Nov. 2, 1920.
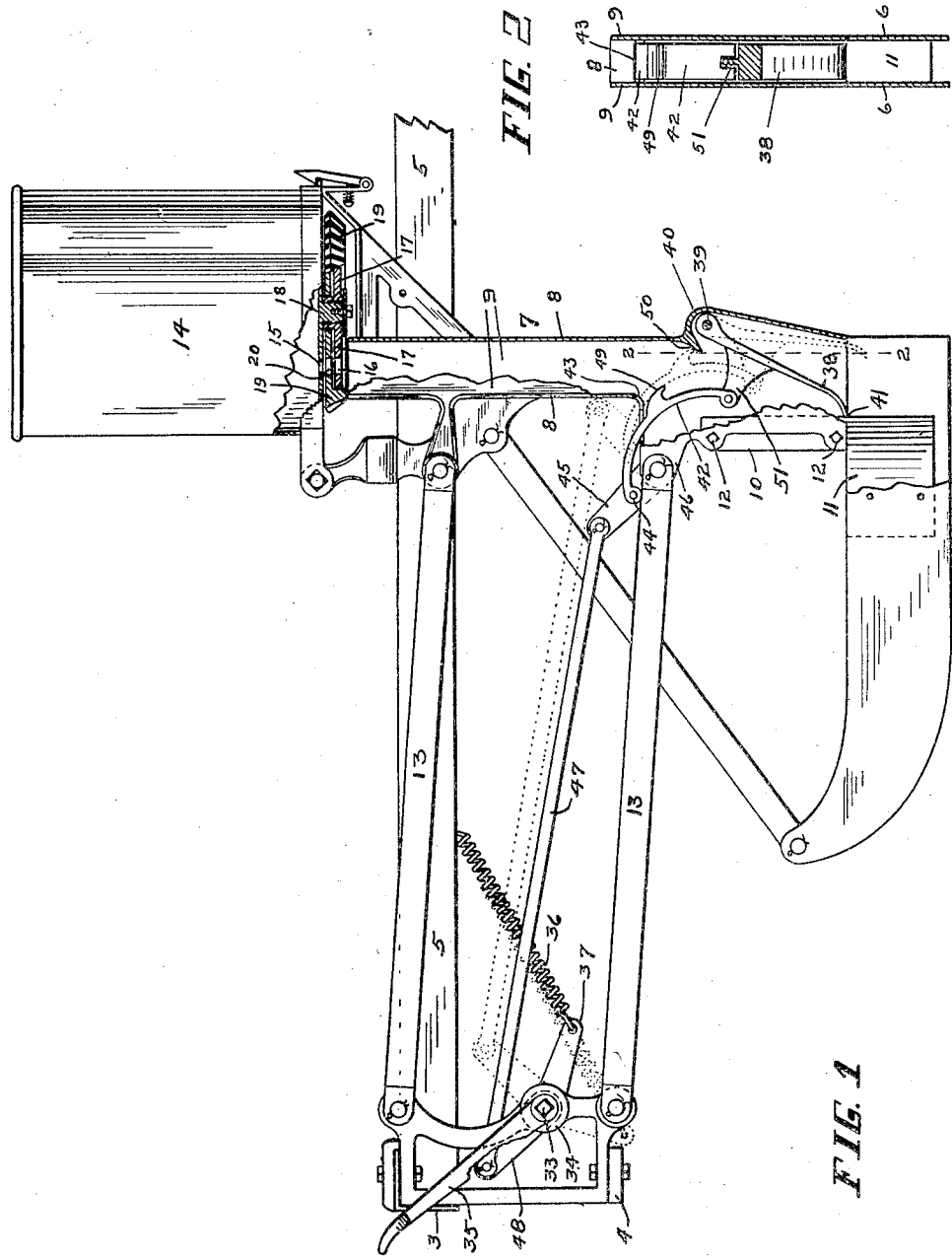
INVENTOR
E. W. PAULSON
BY
Milton C. Crandall
ATTORNEY

UNITED STATES PATENT OFFICE.

ERNEST W. PAULSON, OF SIOUX CITY, IOWA, ASSIGNOR TO PERFECTION CORN PLANTER MANUFACTURING COMPANY, OF SIOUX CITY, IOWA, A CORPORATION OF SOUTH DAKOTA.

VALVE MECHANISM FOR CORN-PLANTERS.

1,357,298.  Specification of Letters Patent.  Patented Nov. 2, 1920.

Application filed January 20, 1919. Serial No. 272,198.

*To all whom it may concern:*

Be it known that I, ERNEST W. PAULSON, a citizen of the United States, and a resident of Sioux City, in the county of Woodbury and State of Iowa, have invented a new and useful Improvement in Valve Mechanism for Corn-Planters, of which the following is a specification.

In corn planters having planting mechanisms mounted to oscillate vertically with respect to each other and the frame, and including furrow openers carrying valved seed chutes controlled by rocking mechanism on the frame, much difficulty has been experienced in the production of valve mechanism which would not affect or be affected by rise and fall of the chute.

The present invention, therefore, aims primarily to provide an improved valve mechanism particularly adapted for corn planters of the above-described type and which obviate the evils mentioned.

Furthermore, the invention contemplates an improved valve mechanism for corn planters, simple and inexpensive in construction, yet thoroughly efficient in operation.

Still another object of the invention is the production of an improved valve mechanism for corn planters, so constructed as to prevent the spreading of seeds as they are dropped.

With these, and other objects in view, the invention, consisting in the construction, combination and novel arrangement of parts, will be fully understood from the following description, reference being had to the accompanying drawings which form a part of this application, and in which like characters of reference indicate corresponding parts in both views, of which—

Figure 1 is a fragmentary side elevation of a corn planter equipped with the preferred embodiment of the invention, parts being cut away, and Fig. 2 is a partial vertical section of the seed chutes, taken on line 2 of Fig. 1.

Although I have illustrated and described the preferred embodiment of the invention, I would not be understood as being limited to such structure specifically, for various alterations and modifications may be made in the details of construction and arrangement of parts, without departing from the spirit and scope of the invention, as defined in the appended claims.

Referring now to the drawings, the corn planter illustrated includes a main frame having upper and lower front transverse members, 3 and 4, respectively, and longitudinal members, 5.

The machine is provided with a plurality of planting mechanisms, identical with the one shown, and each including a furrow opening runner, 6, supporting at its rear an upright seed chute, 7, having front and rear walls, 8, and side walls, 9. The lower portion of the chute may be formed without a front wall, to admit the shank, 10, of the customary shoe, 11, interposed between and riveted to the plates of the runner, and serving to separate the rear ends of the plates to admit seeds to the furrow from the chute; and also to secure the runner to the chute, the shank, 10, being bolted, as at 12, to the side walls of the chute. For this purpose, the lower portion of the side walls are extended a distance forwardly, and the shank, 10, serves as the front wall of the lower portion of the chute.

The chute is secured to the frame and supported against tilting by superposed parallel bars, 13, pivoted at their front ends to the frame, and at their rear ends to the chute, whereby the planting mechanism is free to oscillate vertically with respect to the frame.

Above the chute is suitably supported the seed container, 14, the bottom of which is provided with an opening, 15, registering with an opening, 16, in a disk, 17, fixed on a central lug, 18, depending from the container, and having journaled thereon a bevel gear, 19, interposed between the container and disk, and provided with openings, 20, positioned to pass in registration with the other openings, upon rotation of the gear, to permit passage of seeds from the container to the chute, the number of seeds passed being governed by the distance of rotation of said gear.

The bevel gear, 19, is driven intermittently by any suitable means.

33 is the usual transversely disposed rock-shaft, journaled in bearings on the frame; and carrying the familiar forked trip arm, 35, forced rearwardly and then released by the bosses of the check wire (not shown). The trip arm is held normally forwardly inclined, and retracted by a retracting spring, 36, interposed between the frame and a crank arm, 37, on the rock shaft.

Upper and lower coacting valves are provided for the chute, the latter consisting of a plate, 38, pivoted at its upper end as at 39, in a rearwardly off-set portion, 40 of the rear wall of the chute. The said valve swings forwardly and rearwardly, and is normally forwardly declined, engaging with its lower end is the front wall of the chute, as at 41, at a point approximately at the extreme lower end of the chute. The valve in width, being substantially equal to the transverse depth of the chute, it is clear the valve normally closes the lower end of the chute. The intermediate portion of the lower valve is provided with a forwardly extending fin, 51, to which is pivoted the lower end of the upper valve, consisting of a curved plate, 42, which extends forwardly and upwardly from its lower pivotal point, and through an opening, 43, in the chute, and is pivoted as at 44, to the intermediate portion of a lever arm, 45, fulcrumed at its lower end on a suitable bearing, 46, on the front of the chute, and connected at its free end by a link, 47, with a crank arm, 48, on the rock shaft, 33. The valves and associated parts are so constructed, arranged and related, that normally the pivotal points of the upper valve (which serves as a toggle link between the lower valve and the lever arm) are on a dead center with the lever arm fulcrum, whereby relative oscillation between the chute and the lever arm, due to rise and fall of the chute, will not open the lower valve.

When the shaft, 33, is rocked rearwardly, the valves are thrown into the positions indicated by dotted lines, the lower valve being open, and the upper valve closing the chute by virtue of a lip, 49, on the valve plate, 42, engaging a forwardly declining lip, 50, on the rear wall of the chute immediately above the offset, 40.

Now, it is evident that when the shaft, 33, is rocked rearwardly, the upper valve is closed, and simultaneously the shaft, 29, is rotated a distance to admit a given number of seeds into the chute, as disclosed in my concurrent application, No. 272,199, Jan. 20, 1919. The seeds thus admitted rest on the upper valve, and when the shaft 33 and the valves are retracted, the seeds drop to the lower valve. Then upon repetition of this operation the said seeds are dropped in the furrow and another hill of seeds is dropped upon and held by the upper valve.

Having thus described my invention, what I claim as new and desire to secure by Letters Patent, is,—

1. In a corn planter, a seed chute, a lever arm on the chute, a valve pivoted to swing to and fro to open and close the lower end of the chute, and an upper valve pivoted to said arm and lower valve, to swing to and fro to open and close the chute above the lower valve, said valves and arm being so constructed and related that when one valve is open the other is closed.

2. A corn planter, including a seed chute, a seed container operable to deliver seeds into the chute, a lower valve within the chute, consisting of a plate oscillating between opposite walls of the chute, and normally closing the lower end thereof, a lever arm fulcrumed on the chute, and an upper valve consisting of a plate pivoted as a toggle link between said arm and the lower valve, whereby the arm coacts with the upper valve to open and close the lower valve, said upper valve being adapted to close the chute above the lower valve when the latter is open.

3. A corn planter including a main frame, a seed chute, a seed container operable to deliver seeds into the chute, a rock member on the frame, a lower valve within the chute consisting of a plate oscillating between opposite walls of the chute and normally closing the lower end thereof, a lever arm fulcrumed on the chute and actuated by the rock member, and an upper valve consisting of a plate, pivoted as a toggle link between said arm and the lower valve, whereby the arm coacts with the upper valve to open the lower valve, said upper valve being adapted to close the chute above the lower valve when the latter is open.

4. In a corn planter, a seed chute, a lower valve consisting of a plate pivoted adjacent one wall of the chute to swing to and from the opposite wall, to close the chute, a lever arm fulcrumed on the chute, and an upper valve having one end pivoted on the arm and the other on the lower valve, to open and close the chute above the lower valve, and operate the lower valve when the arm is actuated, said valves and arm being so related that when either is opened the other is closed.

5. In a corn planter, a seed chute, a lower valve consisting of a plate having its upper end pivoted adjacent the rear wall to permit the plate to swing to and from the lower end portion of the front wall, to accordingly close and open the chute, a lever arm fulcrumed on the front of the chute to swing forwardly and rearwardly, the front wall having an opening therein, and an upper valve consisting of a plate extending through said opening and having one end pivoted on the arm and the other on the lower valve, whereby rearward movement of the arm causes the lower valve to open, and the upper valve to move rearwardly, said upper valve being adapted, when moved rearwardly, to engage the rear wall to close the chute.

6. In a corn planter a main frame, a rock member carried thereby, a seed chute, having front and rear walls and mounted to oscillate vertically with respect to the main frame, a normally forwardly inclined lever arm fulcrumed on the front of the chute, a driving connection between said member and arm, a lower valve consisting of a plate pivoted adjacent the rear wall to swing from and to the front wall to accordingly open and close the chute, and an upper valve having one end pivoted to the arm and the other to the lower valve to move to and from the rear wall to accordingly close and open the chute above the lower valve, said lower valve being normally closed, and said arm and valves being so related that when either valve is open the other is closed and the valves being so pivoted that normally the pivotal points of the upper valve are on substantially a dead center with the fulcrum of the said arm.

In testimony whereof I have hereunto set my hand this 4th day of December, 1918.

ERNEST W. PAULSON.